US011993045B2

(12) United States Patent
Colby et al.

(10) Patent No.: US 11,993,045 B2
(45) Date of Patent: May 28, 2024

(54) RETREADED TIRE TREADS HAVING IMPROVED SUBMERGED VOIDS AND METHODS FOR FORMING THE SAME

(71) Applicant: COMPAGNIE GENERALE DES ETABLISSEMENTS MICHELIN, Clermont-Ferrand (FR)

(72) Inventors: E. Bruce Colby, Greenville, SC (US); Metodi L. Ikonomov, Clermont-Ferrand (FR); Dimitri G. Tsihlas, Greer, SC (US); Michael C. Chandler, Travelers Rest, SC (US); Michael Widmyer, Duncan, SC (US)

(73) Assignee: Compagnie Generale des Etablissements Michelin, Clermont-Ferrand (FR)

( * ) Notice: Subject to any disclaimer, the term of this patent is extended or adjusted under 35 U.S.C. 154(b) by 170 days.

(21) Appl. No.: 17/191,626

(22) Filed: Mar. 3, 2021

(65) Prior Publication Data
US 2021/0187888 A1 Jun. 24, 2021

Related U.S. Application Data

(62) Division of application No. 14/914,756, filed as application No. PCT/US2013/057715 on Aug. 30, 2013, now Pat. No. 10,953,617.

(51) Int. Cl.
*B29D 30/56* (2006.01)
*B60C 9/02* (2006.01)
(Continued)

(52) U.S. Cl.
CPC ............... *B29D 30/56* (2013.01); *B60C 9/02* (2013.01); *B60C 11/02* (2013.01); *B29D 30/52* (2013.01);
(Continued)

(58) Field of Classification Search
CPC ........ B29D 30/52; B29D 30/54; B29D 30/56; B29D 2030/061; B29D 2030/544;
(Continued)

(56) References Cited

U.S. PATENT DOCUMENTS 2,843,172 A 7/1958 Berry et al.
2,960,138 A 11/1960 Chiodo
(Continued)

FOREIGN PATENT DOCUMENTS

JP 09011708 A 1/1997
JP 2003200713 A 7/2003
WO 2013115810 A1 8/2013

OTHER PUBLICATIONS

PCT/US2013/057715 International Search Report and Written Opinion dated Jan. 22, 2014.

*Primary Examiner* — Sedef E Paquette
(74) *Attorney, Agent, or Firm* — Hahn Loeser & Parks LLP; Bret A. Hrivnak

(57) ABSTRACT

The invention includes methods for forming a retreaded tire and treads there for. Particular embodiments of such methods include providing a tire carcass configured to receive a tire tread along an annular tread-receiving area and a preformed tread comprising a tread body and a submerged void arranged along a bottom side of the tread and extending into the tread thickness to a top end located below the top side of the tread, the submerged void having a length and an opening arranged along the bottom side when the tread is in an uninstalled configuration, where the opening of the submerged void extends in a direction of the submerged groove length along an alternating, non-linear path. Further steps include assembling a retreaded tire by arranging the tire tread atop a bonding layer arranged between the tire tread and the tire carcass and comprising uncured bonding material.

19 Claims, 4 Drawing Sheets

(51) Int. Cl.
  *B60C 11/02* (2006.01)
  *B29D 30/06* (2006.01)
  *B29D 30/52* (2006.01)
  *B29D 30/54* (2006.01)

(52) U.S. Cl.
  CPC ........ *B29D 30/54* (2013.01); *B29D 2030/061* (2013.01); *B29D 2030/544* (2013.01)

(58) Field of Classification Search
  CPC ......... B60C 9/02; B60C 11/02; B60C 11/032; B60C 11/0323; B60C 11/042; B60C 11/045; B60C 11/1218; B60C 11/1315; B60C 2011/0346; B60C 2011/0353
  USPC .......................... 152/209.18, 548; 156/87, 96
  See application file for complete search history.

(56) References Cited

U.S. PATENT DOCUMENTS

| | | |
|---|---|---|
| 3,735,791 A | 5/1973 | Mckissick et al. |
| 3,806,288 A | 4/1974 | Materick |
| 4,112,994 A | 9/1978 | Mills et al. |
| 5,275,218 A | 1/1994 | Nakayama et al. |
| 2009/0199944 A1 | 8/2009 | Goto et al. |
| 2010/0186858 A1 | 7/2010 | Gallego et al. |
| 2011/0156313 A1 | 6/2011 | Zarak |
| 2011/0168311 A1* | 7/2011 | Voss .................... B60C 11/1281 152/209.18 |
| 2011/0180191 A1 | 7/2011 | Christenbury |
| 2011/0214789 A1 | 9/2011 | Cress et al. |
| 2012/0186725 A1 | 7/2012 | Majumdar et al. |

* cited by examiner

RETREADED TIRE TREADS HAVING IMPROVED SUBMERGED VOIDS AND METHODS FOR FORMING THE SAME

CROSS REFERENCE TO RELATED APPLICATIONS

This patent application is a divisional of U.S. patent application Ser. No. 14/914,756, filed Feb. 26, 2016, and claims priority to, and the benefit of, U.S. patent application Ser. No. 14/914,756, filed Feb. 26, 2016, and International app. no. PCT/US2013/057715, filed Aug. 30, 2013 with the U.S. Patent Office, where U.S. patent application Ser. No. 14/914,756 is a national phase entry of International app. no. PCT/US2013/057715, where each such prior application is hereby incorporated by reference.

BACKGROUND OF THE INVENTION

Field of the Invention

This invention relates generally to retreaded tires and methods for forming the same, and more particularly, to retreaded tire treads having one or more closable submerged voids, such as grooves or sipes.

Description of the Related Art

It is known to form retreaded tire treads having one or more submerged voids arranged along a bottom side of any such tread, each submerged void being open to the bottom side and recessed or submerged below the outer, ground-engaging surface such that the submerged void is substantially hidden from view in the new state of the tread but which becomes exposed when a predetermined thickness of tread has been worn away. In such instances, any such submerged void may provide additional tread void and/or traction edges for enhanced tire performance at worn stages of the tire tread.

It is also known that these submerged voids may be pre-formed prior to applying the tread to a tire carcass, such as by a tread molding operation or by removing tread material from a pre-formed tread, such as by any machining, cutting, or abrading operation. A pre-formed tread cured prior to application to a tire carcass is referred to as a pre-cured tread.

When a tread is pre-formed, the submerged tread voids may be formed along and into or through the bottom side (that is, underside) of the tread, the bottom side being the side of the tread that will later be bonded to the tire casing. In such instances, the submerged void is open to the bottom side of the tread, and therefore, the submerged void is also open to a bonding surface of the tire carcass.

In cold retreading operations, a layer of bonding material (referred to herein as a bonding layer) is commonly arranged between the tire carcass and the pre-formed tread to facilitate bonding of the tread to the tire carcass. The bonding material generally comprises uncured elastomeric material, which includes natural and synthetic rubber. In such instances, after the pre-formed tread is applied to a tire carcass and overtop the bonding layer, the assembled retreaded tire is cured to bond the tread to the tire carcass. In hot retreading operations, during curing operations, the assembled retreaded tire is exposed to heat and pressure. Under these conditions, uncured bonding material may be forced into the submerged void through the bottom side. In effect, this material at least partially fills the void, which may reduce the depth of the void and thereby reducing the skid depth—and ultimately the effectiveness of the submerged feature. For example, when the feature is a groove, the groove provides a void to consume or absorb water for improved wet performance. When the groove is at least partially filled with the displaced uncured bonding material, the loss in void volume reduces the effectiveness of the groove. In another example, the tread feature comprises a sipe, which generally comprises a slit or narrow groove. The sipe provides an additional traction edge for improved tire traction, but also has the effect of reducing local tread stiffness due to the discontinuity that it forms. When the sipe, however, becomes at least partially filled with displaced material, the sipe may operate less than optimally as a traction edge, and/or less reduces the local stiffness of the tread. Accordingly, there is a need to substantially limit and/or prevent the influx, flow, or entry of material into a submerged tread void from the underside of the tread during a curing operation.

SUMMARY OF THE INVENTION

Particular embodiments of the present invention include methods of forming a retreaded tire, as well as retreaded tires and tire treads for use in such methods. Particular embodiments of such methods include providing a tire carcass configured to receive the tire tread along an annular tread-receiving area, the annular tread-receiving area arranged along a radially outer side of the tire carcass, and having a width extending laterally across a width of the tire carcass and a length extending annularly around the tire carcass. Further steps of such methods include providing a pre-formed tire tread. In particular embodiments, the tread comprises a tread body having a length, a width, and a thickness, the thickness being bounded by a top side and a bottom side, and a submerged void arranged along the bottom side and extending into the tread thickness to a top end located below the top side of the tread, the submerged void having a length and an opening arranged along the bottom side when the tread is in an uninstalled configuration, where the opening of the submerged void extends in a direction of the submerged groove length along an alternating, non-linear path. Further steps of such methods include assembling a retreaded tire by arranging the tire tread atop a bonding layer in the installed configuration, the bonding layer arranged between the tire tread and the tire carcass and comprising uncured bonding material.

Particular embodiments of the invention include a retreaded tire, the retreaded tire comprising a tire carcass configured to receive the tire tread along an annular tread-receiving area, the annular tread-receiving area arranged along a radially outer side of the tire carcass, and having a width extending laterally across a width of the tire carcass and a length extending annularly around the tire carcass. The retreaded tire further includes a pre-formed tire tread comprising a tread body having a length, a width, and a thickness, the thickness being bounded by a top side and a bottom side, and a submerged void arranged along the bottom side and extending into the tread thickness to a top end located below the top side of the tread, the submerged void having a length and an opening arranged along the bottom side when the tread is in an uninstalled configuration, where the opening of the submerged void extends in a direction of the submerged groove length along an alternating, non-linear path. The retreaded tire also includes a bonding layer arranged between the tire tread and the tire carcass and comprising uncured bonding material.

The foregoing and other objects, features and advantages of the invention will be apparent from the following more detailed descriptions of particular embodiments of the invention, as illustrated in the accompanying drawings wherein like reference numbers represent like parts of the invention.

DETAILED DESCRIPTION OF THE DRAWINGS

FIG. 1A is a front cross sectional view taken laterally across a tread mold forming a pre-formed retread tire tread, the tread having longitudinal submerged tread voids having openings arranged along a bottom side of the tread, the openings being open to the bottom side while the tread is in an uninstalled configuration comprising a molded configuration, in accordance with an embodiment of the invention.

Figure 2:
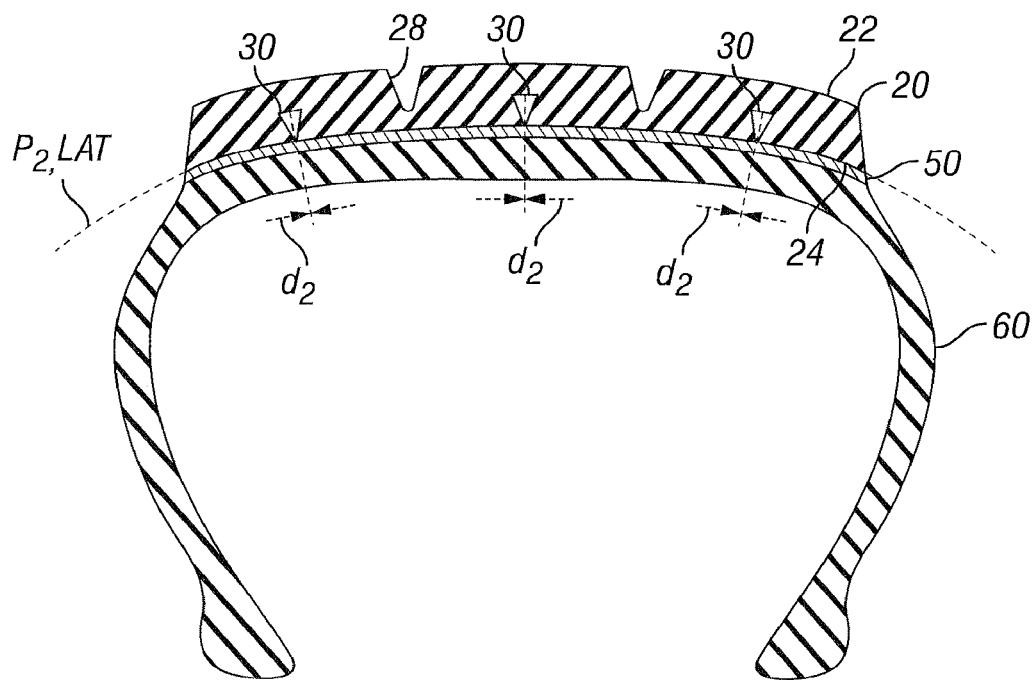
FIG. 2 is a front cross-sectional view of the tire tread of FIG. 1 installed upon a tire carcass with a bonding layer arranged there between, the tread being in an installed configuration whereby openings of the longitudinal submerged voids are arranged in at least a substantially closed configuration.
Figure 3:
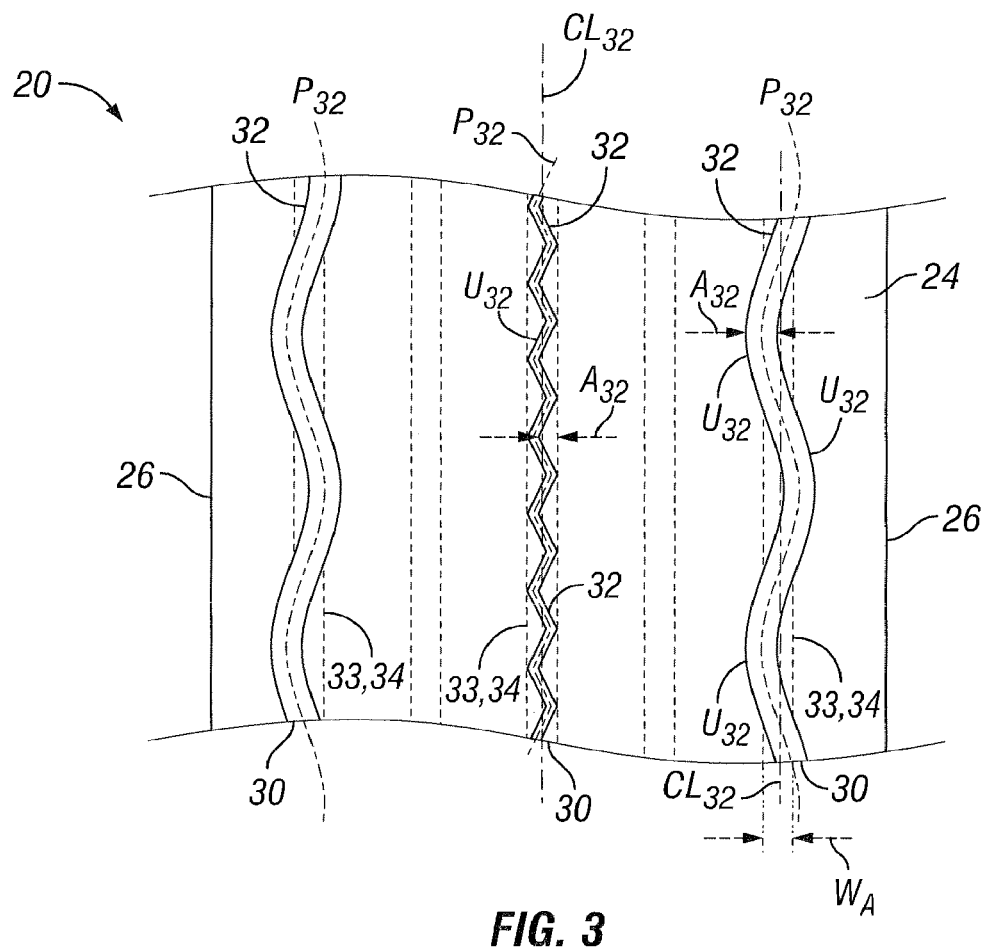

FIG. 3 is a bottom view of the tread of FIG. 2, where the opening of each longitudinal submerged void extends in a direction of the submerged groove length along an alternating, non-linear path and where the top end of the submerged void extends in a direction of the submerged void length along a linear path such that, with regard to the two outermost submerged voids, the undulations of the alternating, non-linear path extend beyond a width or a widthwise extent of the upper portion of each such submerged void and such that, with regard to the central submerged void, the undulations of the alternating, non-linear path extend within a width or a widthwise extent of the upper portion of the submerged void, in accordance with a further embodiment of the invention.

Figure 4:
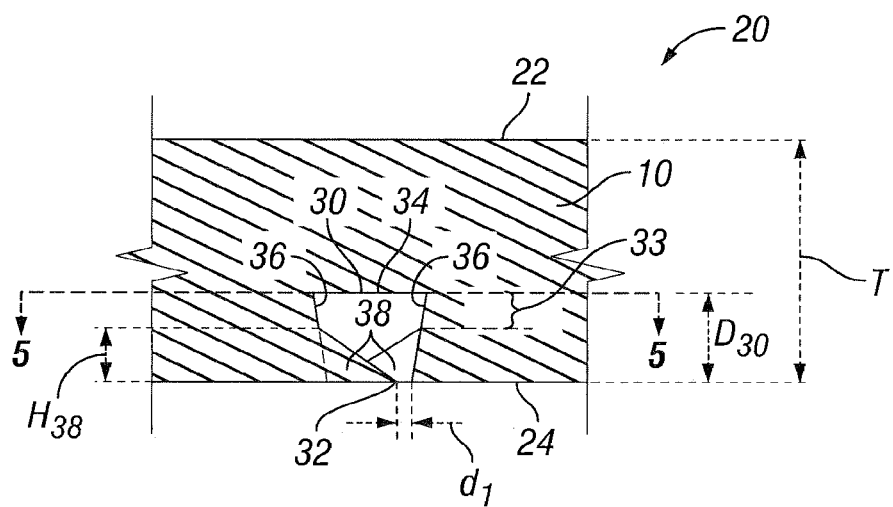

FIG. 4 is a partial front cross-sectional view of a submerged void arranged within the tread thickness along the bottom side, the submerged void including a plurality of projections each extending outwardly from one of a pair of sidewalls of the submerged void and being arranged along the bottom side of the tread to form an opening of the submerged void, the submerged void extending in a direction of the void length along an alternating, non-linear path such that the undulations of the alternating, non-linear path extend within a width or a widthwise extent of the top end of each submerged void, in accordance with a particular embodiment of the invention.

Figure 5:
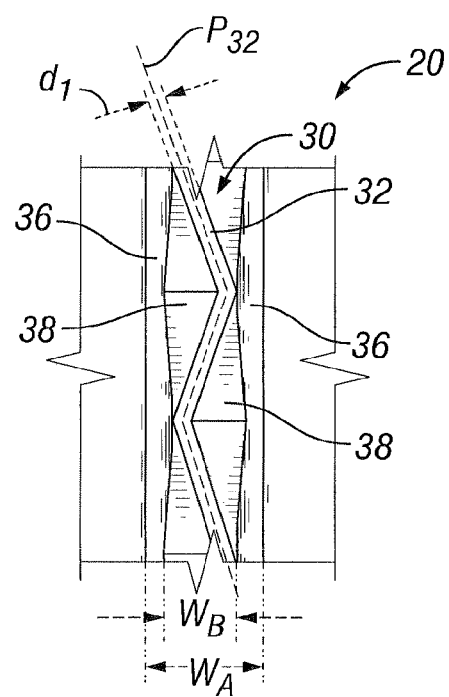

FIG. 5 is a partial sectional view taken along line 5-5 in FIG. 4 showing the plurality of protrusions each extending outwardly from one of the pair of sidewalls of the submerged void, the plurality of protrusions forming the opening of the submerged void along the bottom side of the tread, which extends lengthwise along an alternating, non-linear path.

Figure 6:
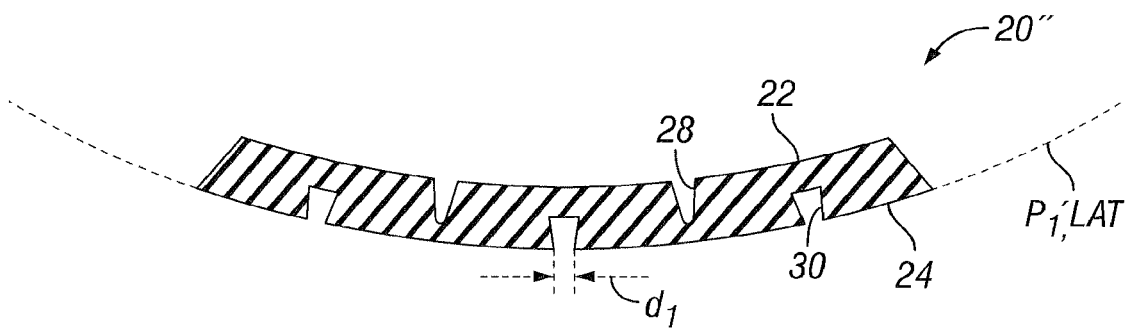

FIG. 6 is a front cross-sectional view of the tire tread of FIG. 1 arranged in an uninstalled configuration having a negative curvature, where the uninstalled configuration is a comprising a molded configuration, in accordance with an exemplary embodiment of the invention.

Figure 7:
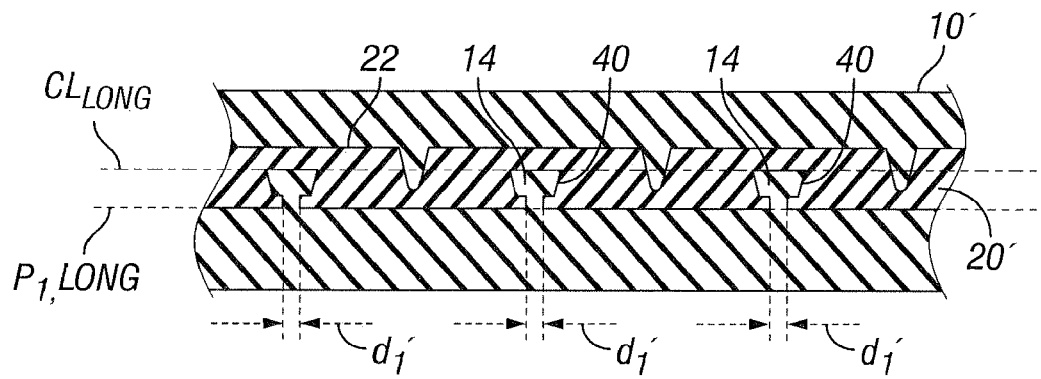

FIG. 7 is a side cross sectional view taken laterally across a tread mold forming a pre-formed retread tire tread, the tread having lateral submerged tread voids having openings formed by opposing protrusions each extending into the void from a sidewall of the void, each opening arranged along a bottom side of the tread and being open to the tread bottom side while the tread is in an uninstalled configuration comprising a molded configuration, in accordance with an embodiment of the invention.

Figure 8:
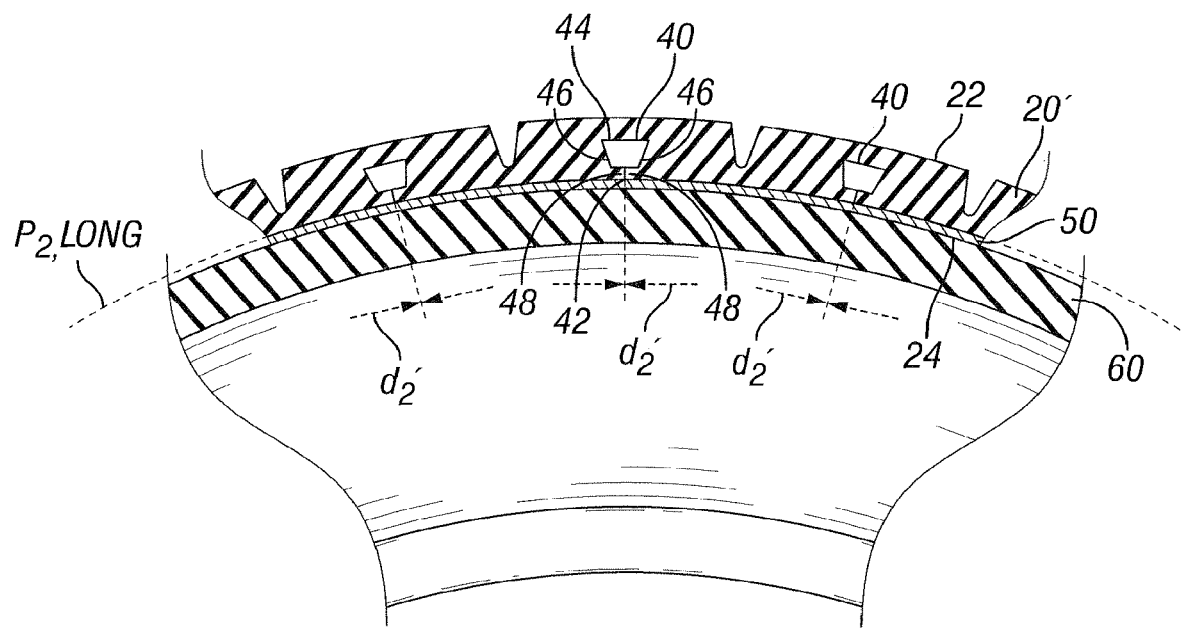

FIG. 8 is a side cross-sectional view of the tire tread of FIG. 7 installed upon a tire carcass with a bonding layer arranged there between, the tread being in an installed configuration whereby openings of the lateral submerged voids are arranged in at least a substantially closed configuration.

DETAILED DESCRIPTION OF PARTICULAR EMBODIMENTS

Particular embodiments of the invention provide a tire tread, tires incorporating such treads, and methods for forming a retreaded tire.

Such methods further include the step of providing a tire carcass configured to receive the tire tread along an annular tread-receiving area. The tire carcass generally includes a pair of beads, a pair of sidewalls, body plies, and a belt package if the tire is a radial tire (otherwise, if not including a belt package, the tire is a biased ply tire). The body plies and belt package generally comprise plies of rubber containing strands of reinforcements. When retreading a tire, a used tire carcass is provided, which generally comprises a cured tire having at least a portion of the old tread removed so that a new tread may be attached to the tire carcass to form a retreaded tire. Commonly, at least a portion of the old tread is removed to a desired depth by performing a buffing or abrading operation. The old tread may be complete or partially removed. The annular tread-receiving area is arranged along a radially outer side of the tire carcass, and has a width extending laterally across a width of the tire carcass and a length extending annularly around the tire carcass. Commonly, a layer of bonding material (referred also as a bonding layer) is arranged along the annular tread-receiving area between tread and the tire carcass to facilitate bonding of the tread to the tire carcass.

Particular embodiments of such methods of forming a retreaded tire comprise the step of providing a pre-formed tire tread comprising a tread body having a length, a width, and a thickness, the thickness being bounded by a top side (also referred to as an "outer side") and a bottom side (also referred to as an "underside"), and a submerged void arranged along the bottom side and extending into the tread thickness to a location below the top side, the submerged void having an opening arranged along the bottom side. It is understood that the submerged void may comprise any desired void, such as a groove or a sipe, for example. A sipe is a narrow groove or slit, usually having a width equal to or less than 2 millimeters (mm) or equal to or less than 1 mm, for example. In its narrowest form, a sipe may form a slice in the tread thickness. In particular embodiments, a sipe is described as having a width that allows the sipe to close or collapse, or to remain substantially closed, when traveling through a tire footprint (where the tire engages the ground), even though any the sides of the sipe may shift or otherwise distort relative each other. In particular embodiments, the step of providing a pre-formed tire tread includes the opening of the submerged groove being open when the tread is in an uninstalled configuration, the opening being configured to substantially close to an opening of 2 millimeters (mm) or less when the tread is arranged in an installed configuration. One aim of the invention is to more easily form a tread having a submerged void that prevents substantial flow of uncured bonding material therein. In accomplishing this, in particular embodiments, the opening of the submerged void is configured to substantially close (that is, at least nearly close) when the tread is altered or reconfigured from an uninstalled configuration to an installed configuration. In doing so, the tread is bent or deflected laterally and/or longitudinally from the uninstalled configuration to the installed configuration, and by doing so, the opening of the submerged void on the bottom side of the tread is substantially closed to an opening of 2 mm or less. To better describe this, it can be said that the bottom side or a centerline of the tread thickness, extending within the tread thickness in either in a lateral direction of the tread or a longitudinal direction of the tread, extends along a first path when in the uninstalled configuration. For example, in particular embodiments, the uninstalled configuration is a molded arrangement of the tread. It can be further said that the centerline extends along a second path when in the installed arrangement. For example, in particular embodiments, the installed configuration extends along a second path comprising an arcuate (i.e., curvilinear) path similar to the lateral or longitudinal contour of the annular tread-receiving area of the tire carcass.

In reconfiguring the tread from an uninstalled configuration to an installed configuration along the tire carcass, it can be said that the second path has a curvature greater than the first path, or, in other words, where curvature is defined by a radius of curvature, a radius of curvature of the second path is smaller than the radius of curvature of the first path. In describing this invention, throughout this application and claims, a positive curvature connotes a curvature greater than zero curvature, where zero curvature reflects a straight line, such as when the bottom side or thickness centerline of the tread is straight or flat. For example, a tread bottom side or thickness centerline may have a zero curvature when the tread is molded in a flat mold (which is a molded configuration). Positive curvature also connotes a curvature that is downward convex or, in other words, upward concave. For example, when installed on a tire in an installed configuration, a tire tread often has a curvature that peaks around a widthwise centerline of the tire, where the tire is at its greatest diameter or circumference, and subsequently curves downwardly as the diameter or circumference decreases as the tread approaches its widthwise extent at each shoulder of the tread. This curvature exemplifies a positive curvature, or, a curvature that is downwardly convex or upward concave. Therefore, in particular embodiments, the thickness centerline or bottom side the tread in the uninstalled configuration is characterized as being a straight line or, in other words, as having a zero curvature, in other embodiments.

However, if the width of the submerged void opening to the bottom side is larger, greater deflection between the uninstalled configuration and the installed configuration may be required to at least substantially close the opening. Therefore, a greater difference in curvature between the first and second paths in the uninstalled and installed configurations is needed. In instances when the curvature of the second path in the installed configuration is fixed, meaning that it is generally not alterable for a given tire size and type, the curvature of the first path in the uninstalled configuration may be further decreased to achieve a greater difference in curvature between the first and second paths. By doing so, the change in curvature—and therefore the change in deflection—is increased between uninstalled and installed configurations of the tread. In this situation, to achieve this, a decrease in curvature of the first path is required, which means that the curvature of the first path may extend beyond zero curvature to provide a negative curvature, where the first path can be described as downwardly concave or upwardly convex. For example, in particular embodiments, a tire tread is molded in a downwardly concave or upwardly convex configuration, whereby the top side is downwardly concave and/or the bottom side is upwardly convex to achieve a thickness centerline or bottom side extending along a first path in an uninstalled configuration is characterized as having a negative curvature.

As described above, the thickness centerline or bottom side may be referred to as extending in either a lateral direction of the tread, which, in other words, extends in a direction of the tread width (i.e., a widthwise direction), or in a longitudinal direction of the tread, which, in other words, extends in a direction of the tread length—which is a circumferential direction when installed along the annular tire carcass. Therefore, in particular embodiments of such methods, the submerged void has a length extending in a longitudinal direction of the tread, and where a width of the bottom side extends along the first path in the uninstalled configuration and along the second path in the installed configuration. In such instances, the submerged void may be either a longitudinal groove or sipe, which may extend perpendicular to a longitudinal centerline of the tread length (where the centerline extends in a lateral direction of the tread) or at another angle biased to the longitudinal centerline or to a lateral void of the tire tread. In further embodiments, the submerged void has a length extending in a lateral direction of the tread, and where a length of the bottom side extends along the first path in the uninstalled configuration and along the second path in the installed configuration. In such instances, the submerged void may be either a lateral groove or sipe, which may extend perpendicular to a lateral centerline of the tread width (where the centerline extends in a longitudinal direction of the tread) or at another angle biased to the lateral centerline or to a longitudinal void of the tire tread.

In alternative embodiments of the invention, a tread having a submerged void that prevents substantial flow of uncured bonding material therein is formed without needing the opening of the submerged void to substantially close when the tread is altered or reconfigured from an uninstalled configuration to an installed configuration. Instead, in alternative embodiments, a tread is provided that may be installed in an installed configuration such that the lateral configuration of the tread in the installed configuration (which is also referred to herein as an "installed lateral configuration") is substantially the same as the lateral configuration of the tread in an uninstalled configuration of the tread (which is also referred to herein as an "uninstalled lateral configuration"), even though the tread includes one or more submerged voids each configured to prevent substantial flow of uncured bonding material therein. In particular exemplary embodiments, such a tread may be installed in an installed lateral configuration substantially the same as (equal to) a lateral configuration of the tread in a molded configuration of the tread (which is also referred to herein as a "molded lateral configuration"). For example, the tread may be molded flat, and installed in a generally flat configuration in a lateral or widthwise direction of the tire—where the width of the tread is installed in a configuration where the width generally extends linearly in a direction of the tire width even though a length of the tread will extend annularly around the tire carcass. In such instances, the tread is molded such that the opening of the submerged tread void along the bottom side is at least substantially closed, which means that the opening has a molded width equal to or less than 2 mm or 1 mm, in different embodiments. Less than 2 mm or 1 mm each contemplate that the opening may be closed. The alternative treads may include additional features discussed further below, which may further resist the desire of the bonding layer to penetrate the opening and the submerged void.

Such methods further include the step of assembling a retreaded tire by arranging the tire tread atop a bonding layer in the installed configuration, the bonding layer arranged between the tire tread and the tire carcass and comprising uncured bonding material. In more particular embodiments, in the step of assembling, the opening of the submerged void is substantially closed to an opening of 2 mm or less in the installed configuration. In such instances, as mentioned above, by changing or reconfiguring the tread from the uninstalled configuration to the installed configuration, the tread is bent or deflected so to change the configuration of the submerged void opening from being open to the bottom side to being substantially closed to the bottom side, that is, to be substantially closed to an opening of 2 mm or less. In certain embodiments, the submerged void opening is substantially closed to an opening of 1 mm or less to the bottom side during the step of assembling. In yet further embodiments, the submerged void opening is closed to the bottom side during the step of assembling. It is noted that the bonding layer comprises any suitable uncured bonding material, such as any natural or synthetic rubber, for example.

To better ensure that the submerged void opening does not deviate and reopen from the substantially closed arrangement as the assembled retreaded tire undergoes a curing operation, in particular embodiments it may be desired to further strengthen the portions of the submerged void forming the opening. Therefore, in certain embodiments, the opening of the submerged void extends in a direction of the submerged void length along an alternating, non-linear path—where the top side of the submerged void may extend in a linear or non-linear path in a direction of the submerged void length. In other words, in can be said that opposing portions of the tread forming the opening of the submerged void extend in a direction of the submerged void length along an alternating, non-linear path, while a top side of the submerged void extends along any desired path, which may be linear or non-linear, which includes an alternating, non-linear path. The linear path may be a curvilinear path, such as when the tread is molded in an annular mold or when in an installed configuration about the annular tire carcass. An alternating, non-linear path may comprise an path that alternates, undulates, or oscillates as the path extends along its length. For example, an alternating, non-linear path may comprise a waveform, such as a sinusoidal path, a stepped path, or a zigzagged (i.e., saw tooth) path. By further example, an alternating, non-linear path can be described as a path alternating in a direction transverse to the length of the submerged void. In effect, the alternating, undulating, or oscillating non-linearity of the opening length, and therefore of the substantially closed opening, provides improved rigidity to resist the tendency of the uncured bonding layer material to penetrate the opening and ultimately the submerged void arranged along the tread bottom side.

In such instances where the opening extends along an alternating, non-linear path, it is appreciated that the submerged void may otherwise extend lengthwise (that is, in a direction of the submerged void length) along a path different from the path of the opening. For example, in particular embodiments, portions of the submerged void above the opening extend in a direction of the submerged void length along a path different than the path of the opening. For example, in certain embodiments, the top end of the submerged void extends along a path different than the opening in a direction of the submerged void length. By further example, in more particular embodiments, the top end of the submerged void extends along a linear path in a direction of the submerged void length. Of course such portions of the submerged groove other than the opening may extend along any linear or non-linear path as desired.

In particular embodiments of such methods, the submerged void includes a pair of opposing sides extending from the top end to the opening to define a width of the submerged void, where at least a portion of one of the pair opposing sides extends into the tread thickness from the opening along a taper and in a direction away from the other of the pair of opposing sides, such that the width of the submerged void is variable and increases in a direction of the tread thickness from the tread bottom side. In other words, at least one of a pair of opposing sides defining a width of the submerged groove is tapered, such that the width of the submerged void increases as the submerged void extends further into the tread thickness from the bottom side (or, decreases as the submerged void extends from the top end of the submerged void to the opening arranged along the bottom side of the tread. It is understood that one or both of the pair of opposing sides may include one or more tapers. Therefore, in certain embodiments, the submerged void includes a pair of opposing sides extending from the top end to the opening to define a width of the submerged void, where at least a portion of each of the pair opposing sides extends into the tread thickness from the opening along a taper and in a direction away from the other of the pair of opposing sides. It is appreciated that in any such embodiment including one or more tapers on at least one side of the submerged void, each taper is arranged along, or forms or defines, a protrusion extending outwardly from one of the pair of opposing sides. It is understood that the opposing portions of the tread forming the opening may comprise opposing sides or sidewalls of the submerged void or one or more protrusions extending outwardly from each of the opposing sides or sidewalls, which may or may not also extend along the bottom side of the tread. Consistent with the prior discussion regarding the cross-sectional shape of the void, it is also understood that the one or more protrusions may form any desired shape.

Providing one or more tapers, which may comprise a plurality of protrusions, along a side of the submerged void provides additional rigidity to better maintain the opening in a substantially closed configuration and resist the influx of uncured bonding layer material during tire retreading curing operations. By doing so, the tapered portion of any side and each protrusion acts as a chamfer or fillet to increase the strength and/or rigidity of the opposing portions forming the opening. Therefore, the addition of one or more tapers on one or both opposing sides of the submerged void may be employed in addition to, or separate from, the opening being configured to at least substantially close between an uninstalled and installed configuration as discussed above. Accordingly, in particular embodiments, the submerged void does not close from an open arrangement when the tread is transformed from an uninstalled configuration to an installed configuration, but rather the submerged void is already configured in a substantially closed arrangement when the tread is the uninstalled or molded configuration. For example, in particular embodiments where the tread is molded in a flat configuration to have a substantially closed submerged void opening, and installing the tread in a substantially flat lateral configuration on a tire carcass, the submerged void has one or more tapers or protrusions arranged along one or both of the opposing sides to better maintain the opening in a substantially closed configuration. It is also noted that when tapering the submerged void width down to the opening, the depth of the submerged void does not change. Therefore, the submerged void may be strengthened and/or its rigidity increases without substantially reducing its depth. Furthermore, by providing a substantially closed opening, whether originally (i.e., in a molded configuration) or by deflecting the tread between uninstalled and installed configurations, the surface area on the bottom side of the tread is maximized, which maximizes the bonding surface area for improved attachment of the tread to the tire carcass. An further benefit of providing one or more tapers or a plurality of protrusions is that the one or more mold elements configured to form a submerged void in a mold during a molding process is stronger and/or more rigid since reciprocal features for forming the tapers or protrusions in the tread form tapers or recesses in the mold element. By increasing the strength and/or rigidity, the mold element may be thinner, which then allows thickness to be sufficiently thin to provide a substantially closed opening of the submerged void in the tread.

It is understood that a taper or protrusion may extend along the full height of any such side, or may extend partially along any such side. In particular embodiments, any taper or protrusion extends into the tread thickness from the opening, or, in other words, from at least one or both of the opposing portions forming the opening. It is also appreciated that the taper or protrusion may extend into the tread thickness along any linear or non-linear path (i.e., the taper may be a linear or non-linear taper). Furthermore, each taper or protrusion may remain constant along a length of the submerged void, or may vary in size and/or shape. In particular embodiments, a plurality of tapers or protrusions are arranged in an array along a length of the submerged void, whether in abutment or spaced intermittently along the length. Accordingly, the widthwise profile (i.e., cross-sectional shape) of any portion of the submerged void, which is taken normal to the length of the submerged void, may comprise any desired shape. For example, the cross-sectional shape may comprise a V-shaped, pear-shaped, or trapezoidal shape. The cross-sectional shape may also be symmetrical or asymmetrical relative a widthwise centerline of the void, extending in a direction of the tread thickness normal to the bottom side of the tread.

It is understood that the submerged void may comprise any desired cross-sectional shape. Nonetheless, in operation of such methods, the submerged void comprises a pair of opposing sides extending in a direction of the tread thickness to define a width of the submerged void, whereby the pair of opposing sides are spaced apart in the uninstalled configuration and are engaged with one another in the installed configuration. In particular embodiments of such configurations, the submerged void comprises a pair of opposing sidewalls extending in a direction of the tread thickness to define a width of the submerged void, whereby the pair of opposing sidewalls are spaced apart in the uninstalled configuration and are engaged with one another in the installed configuration. In other embodiments of such configurations, the submerged void comprises a pair of opposing sides extending in a direction of the tread thickness to define a width of the submerged void, whereby one of the pair of opposing sides includes a protrusion extending into the width of the submerged void from a sidewall of the submerged void and extending substantially along the tread bottom side such that the protrusion is spaced apart in the other of the pair of opposing sides in the uninstalled configuration and is engaged with the other of the pair of opposing sides in the installed configuration.

Particular embodiments of the methods discussed above will now be described in further detail below in association with the figures filed herewith exemplifying the performance of the methods in association with particular embodiments of the tread.

Figure 1A:
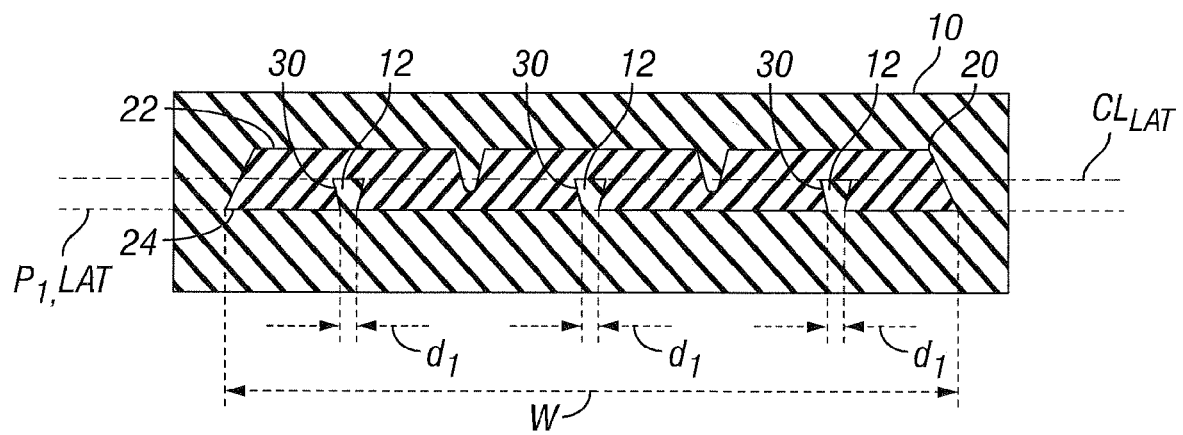
FIG. 1B is a front cross-sectional view of the retread tire tread of FIG. 1 shown removed from the mold in the uninstalled configuration.
Figure 1B:
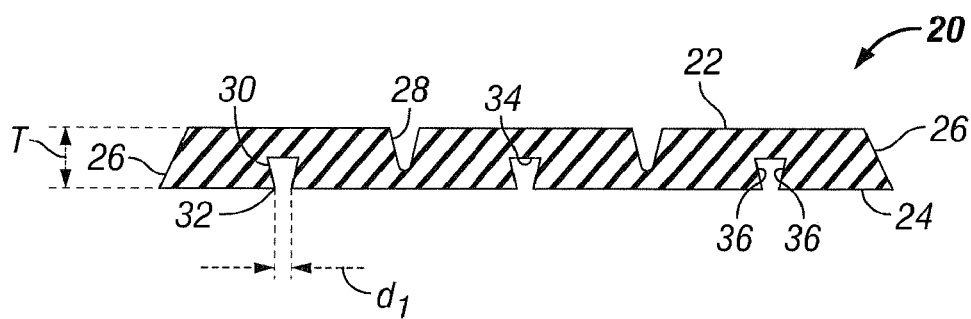

With reference to the exemplary embodiment of FIG. 1A, a tread mold 10 is shown in front cross-section forming a pre-formed retread tire tread 20 having longitudinal submerged tread voids 30 each formed by a corresponding mold protrusion 12. The tread 20 and its features is shown more clearly in FIG. 1B subsequent removal from the mold 10. As is readily apparent in FIGS. 1A and 1B, figures, tread 20 comprises a top side 22 and a bottom side 24 defining a thickness T of the tread and a width W. The tread 20 further includes top side voids 28 and longitudinal submerged tread voids 30 having openings 32 arranged along a bottom side 24 of the tread, the openings being open to the bottom side while the tread is in an uninstalled configuration comprising a molded configuration, in accordance with an embodiment of the invention. It can be said that each opening 32 is formed by a pair of opposing portions of the tread, which may arranged along the bottom side or elevated above the bottom side in different embodiments. It is the pair of opposing portions of the tread that define each opening 32 and alternate along the alternating, non-linear path with the opening. Each void 30 also includes a top end 34 submerged or recessed below tread top side 22 and opposing sides or sidewalls 36. As is shown, in the uninstalled configuration, the tread extends laterally along a first path $P_{1,\,LAT}$ in a direction of the tread width W where the openings 32 are open along the bottom side 24 by a distance $d_1$. The centerline $CL_{LAT}$ of the tread thickness, extending in a lateral direction of the tread, can also be said to extend in a direction the same as first path $P_{1,\,LAT}$.

With reference now to the embodiment of FIG. 2, the tire tread 20 of FIG. 1 is now shown exemplarily installed upon a tire carcass 60 with a bonding layer 50 arranged there between, the tread being in an installed configuration whereby openings 32 of the longitudinal submerged voids 30 are arranged in at least a substantially closed configuration, where the openings are substantially closed to a distance $d_2$ of 2 mm or less, where substantially closed connotes nearly closed to an opening of 2 mm or less. Specifically, the openings as shown are closed. In the installed configuration, the tread bottom side 24 extends along a second path $P_{2,\,LAT}$ in a direction of the tread width W. It is noted that the second path $P_{2,\,LAT}$ has a curvature greater that the first path $P_{1,\,LAT}$. In particular, it is noted that path $P_{2,\,LAT}$ can be described as a downwardly convex or upwardly concave path, while path $P_{1,\,LAT}$ can be described as being a linear or flat path.

With reference now to FIG. 3, a bottom view of the tread of FIG. 2 is shown, where the openings of each of the longitudinal submerged voids extend in a direction of the submerged groove length along an alternating, non-linear path $P_{32}$ and where the top end 34 of the submerged void extends in a direction of the submerged void length along a linear path, in accordance with a further embodiment of the invention. While the alternating, non-linear path may comprise any desired non-linear path having constant or variable alternations extending transverse to the lengthwise direction of the submerged void (as discussed in more detail above), the non-linear path is a path alternating in a direction transverse to the length of the submerged void (that is, in a direction of the submerged void width—or a widthwise direction of the submerged void), which is shown to be a sinusoidal path in the embodiment shown. Accordingly, the alternating path may have any desired frequency of undulations (that is, alternations), which may be of any size or amplitude. An undulation is defined as a deviation extending transverse to the lengthwise direction of the submerged void relative a centerline extending in a direction of the lengthwise direction of the submerged void. The amplitude is the maximum distance by with each undulation extends from the centerline. For example, with reference to the embodiment of FIG. 3, with regard to the two outer submerged voids, the length or amplitude $A_{32}$ of each undulation $U_{32}$ (which is embodied in or defines each opposing portion forming the opening) is greater than a width of the submerged void—which includes a width of the top end 34, or more generally a width $W_A$ of an upper portion 33 of the submerged void 30, where the upper portion is arranged deeper into the tread thickness relative the opening and the pair of opposing portions. In this embodiment, the opening 32 and the path $P_{32}$ along which it extends is directed outside the width of the top end 34, or more generally outside a width $W_A$ associated with an upper portion 33, of the submerged void. With regard to the central submerged void arranged between the two outer submerged voids in the embodiment shown in FIG. 3, each of the protrusions 38, or more generally each of the opposing portions forming the opening 32, has a length or amplitude $A_{32}$ that is less than a width of the submerged void. In this embodiment, the opening 32, and the path $P_{32}$ along which is extends, is contained within a width of the submerged void, and more specifically within a width $W_A$ of an upper portion 33, of the submerged void. This is also shown in the embodiment of FIG. 5. It is appreciated that in other embodiments, each undulation may be equal to a width of the opening, which may result in a closed opening or when the undulation extends outside a width of an upper portion of the submerged void.

With reference to the exemplary embodiment of FIG. 4, a partial front cross-sectional view of a submerged void 30 is shown arranged within the thickness of a tread 20, the submerged void including a plurality of projections 38 each extending outwardly from one of a pair of sidewalls 36 of the submerged void and being arranged along the bottom side 24 of the tread to form an opening 32 of the submerged void, the submerged void extending in a direction of the void length along an alternating, non-linear path $P_{32}$. A top sectional view of the tread and projections are also shown in FIG. 5 for improved clarity. As shown in FIGS. 4 and 5, it is appreciated that each of the protrusions 38 taper outwardly from a side or sidewall 36 of the submerged void 30 as the protrusions extend downwardly toward the bottom side 24 of the submerged void 30. In the embodiment shown, each protrusion 38 initially extends outwardly from the side or sidewall 36 at an intermediate location of the void depth $D_{30}$ of the submerged void 30. In other embodiments, the protrusion may initiate anywhere along the depth $D_{30}$, including at a top of the depth at the intersection of the side or sidewall 36 and the top end 34. It yet other embodiments, when a taper initiates at intersection of the side or sidewall 36 and the top end 34, it can be said that the taper is arranged along, or forms a portion of, a side or sidewall 36 in lieu of being a protrusion, such as in embodiments where the opening extends along a linear path $P_{32}$. Nonetheless, in any embodiment, the side or sidewall may be inclined even when one or more protrusions are provided. Furthermore, in any embodiment, the taper may otherwise extend at any angle relative a vertical centerline extending perpendicular to a lateral and longitudinal direction of the tread (that is, in a direction of the tread width and length, respectively).

It is understood that each of the protrusions more generally comprise one of a pair of opposing portions forming an opening of the submerged void along the bottom side of the tread, as discussed previously herein. For clarity, "a pair of opposing portions" refers to a pair of opposing structure of the tread defining or forming the opening along the bottom side. As noted above, each of the opposing structures may comprise tapered side or sidewall of the submerged void or may form a protrusion extending outwardly from a side or sidewall of the submerged void. For example, at least one of the pair of opposing portions may comprise a tapered side or sidewall of the submerged void, or a protrusion. By further example, both of the pair of opposing portions comprise a tapered side or sidewall of the submerged void, a protrusion, or a combination thereof, where one of the pair is a protrusion and the other a tapered side or sidewall.

With reference to the exemplary embodiment of FIG. 6, the tread of FIG. 1 is shown having a negative curvature to increase the amount of closure obtained when reconfiguring the tread from an uninstalled configuration to an installed configuration. In particular, tread 20" is shown in a molded configuration without the mold for ease of viewing. The tread 20", in the molded configuration, has a negative curvature in a downwardly concave or upwardly convex configuration. In particular, the bottom side 24 extends along a path $P_{1',LAT}$ that having a negative curvature, which is downwardly concave or upwardly convex. Accordingly, when installing the tread 20" along path $P_{2,LAT}$ as described in FIG. 2, a larger difference between $d_1$ and $d_2$ is obtained by the tread 20" of FIG. 6 when compared to the difference in distance between $d_1$ and $d_2$ as obtained in the tread 20 of FIG. 1A.

As discussed above, the submerged void may comprise a longitudinal or lateral void. Accordingly, the principles discussed above in association with a longitudinal submerged void in FIGS. 1-3 are now discussed in association with an exemplary lateral submerged void in FIGS. 7 and 8. In FIG. 7, an exemplary mold 10' is shown forming an exemplary pre-formed tread 30', the tread having lateral submerged tread voids 40 each including an opening 42. In the embodiment shown, each submerged tread void 40 includes a plurality of protrusions 48 that form an opening 42. The arrangement of protrusions are staggered or alternate from side-to-side along a length of each opening to form an alternating array of protrusions. Each of the opposing protrusions 48 extend into the void 42 from a side or sidewall 46 of the void. Each opening 42 is arranged along a bottom side 24 of the tread 20 and is open to the tread bottom side by a distance $d_1'$ while the tread is in an uninstalled configuration comprising a molded configuration, which extends along a first path $P_{1,LONG}$. Path $P_{1,LONG}$ can be described as a linear or flat path.

With reference now to the exemplary embodiment of FIG. 8, the tread 20 of FIG. 7 is shown installed upon a tire carcass 60 with a bonding layer 50 arranged there between, the tread being in an installed configuration whereby openings 42 of the lateral submerged voids 40 are arranged in at least a substantially closed configuration, where the tread bottom side 24 extends along a second path $P_{2,LONG}$ having a curvature greater than the curvature of first path $P_{1,LONG}$ to thereby reduce opening distance $d_1'$ to at least a substantially closed distance of $d_2'$. Path $P_{2,LONG}$ can be described as a downwardly convex or upwardly concave path. In further embodiments, just as the opening 32 of the submerged void 30 extends along an alternating, non-linear path, as exemplarily shown in FIG. 3, so may the opening 42 of submerged void 40 in FIGS. 4 and 5. It is noted that in FIG. 5, submerged void 40 includes a top end 44 submerged or recessed below tread top side 22.

The present invention may be utilized in association with retreaded tires, and in particular for heavy duty trucks and trailers. Heavy duty truck tires include steer and drive tires and trailer tires. Nevertheless, the present invention may be utilized in association with any type of tire to form new or retreaded tire and as such, any type of tire may provide an embodiment of the present invention. Exemplary tire types for use with the subject invention further include light truck tires, off the road tires, bus tires, aircraft tires, bicycle tires, motorcycle tires, and passenger vehicle tires.

The terms "comprising," "including," and "having," as used in the claims and specification herein, shall be considered as indicating an open group that may include other elements not specified. The terms "a," "an," and the singular forms of words shall be taken to include the plural form of the same words, such that the terms mean that one or more of something is provided. The terms "at least one" and "one or more" are used interchangeably. The term "single" shall be used to indicate that one and only one of something is intended. Similarly, other specific integer values, such as "two," are used when a specific number of things is intended. The terms "preferably," "preferred," "prefer," "optionally," "may," and similar terms are used to indicate that an item, condition or step being referred to is an optional (i.e., not required) feature of the invention. Ranges that are described as being "between a and b" are inclusive of the values for "a" and "b" unless otherwise specified.

While this invention has been described with reference to particular embodiments thereof, it shall be understood that such description is by way of illustration only and should not be construed as limiting the scope of the claimed invention. Accordingly, the scope and content of the invention are to be defined only by the terms of the following claims. Furthermore, it is understood that the features of any specific embodiment discussed herein may be combined with one or more features of any one or more embodiments otherwise discussed or contemplated herein unless otherwise stated.

We claim:

1. A method of forming a retreaded tire comprising the steps of:
   providing a tire carcass configured to receive a tire tread along an annular tread-receiving area, the annular tread-receiving area arranged along a radially outer side of the tire carcass and having a width extending laterally across a width of the tire carcass and a length extending annularly around the tire carcass;
   providing a pre-formed tire tread comprising:
   a tread body having a length, a width, and a thickness, the thickness being bounded by a top side and a bottom side; and,
   a submerged void arranged along the bottom side and extending into the tread thickness to a top outermost end located below the top side of the tread, the submerged void having a length extending in a direction of the tread width and an opening arranged along the bottom side when the tread is in an uninstalled configuration, the opening having a molded width of less than 1 millimeter (mm) where the submerged void comprises a pair of opposing sides extending from the top outermost end to the bottom side of the tread to define a width of the submerged void, where the width of the submerged void continuously narrows as the submerged void extends from the top outermost end until reaching the bottom side of the tread, where the opening of the submerged void extends in a direction of the submerged void length along an alternating, non-linear path; and,
   assembling a retreaded tire by arranging the tire tread atop a bonding layer in an installed configuration, the bonding layer arranged between the tire tread and the tire carcass and comprising an uncured bonding material, where, in the installed configuration, the opening is substantially closed.

2. The method of claim 1, where the bottom side of the tire tread extends along a first path in the direction of the tread length in the uninstalled configuration and along a second path in the direction of the tread length in the installed configuration, the second path having a curvature greater than the first path.

3. The method of claim 2, where the first path has a zero curvature.

4. The method of claim 2, where the first path has a negative curvature relative to the curvature of the second path.

5. The method of claim 1, where the narrowing width is at least partially defined by a protrusion extending outwardly from one of the pair of opposing sides.

6. The method of claim 1, where the alternating, non-linear path comprises a path alternating in a direction transverse to the length of the submerged void.

7. The method of claim 1, where the alternating, non-linear path comprises a sinusoidal path.

8. The method of claim 1, where the non-linear path comprises a zigzagged path.

9. The method of claim 8, where the top outermost end of the submerged void extends along a path different than the opening in a direction of the submerged void length.

10. The method of claim 1, where the non-linear path comprises a stepped path.

11. The method of claim 10, where the top outermost end of the submerged void extends along a linear path in a direction of the submerged void length.

12. The method of claim 1, where portions of the submerged void above the opening extend in a direction of the submerged void length along a path different than the path of the opening.

13. The method of claim 1, whereby each of the pair of opposing sides are spaced apart in the uninstalled configuration and are engaged with one another in the installed configuration, and where each of the pair of opposing sides includes a sidewall extending in a direction of the tread thickness to define a width of the submerged void, whereby the sidewalls of the pair of opposing sides are spaced apart in the uninstalled configuration and are engaged with one another in the installed configuration.

14. The method of claim 1, whereby each of the pair of opposing sides are spaced apart in the uninstalled configuration and are engaged with one another in the installed configuration, whereby one of the pair of opposing sides includes a protrusion extending into the width of the submerged void from a sidewall of the submerged void and extending substantially along the tread bottom side such that the protrusion is spaced apart from the other one of the pair of opposing sides in the uninstalled configuration and is engaged with the other of the pair of opposing sides in the installed configuration.

15. The method of claim 1, where the pre-formed tire tread is pre-cured.

16. The method of claim 1, where the top outermost end is substantially flat and located substantially parallel to and below the top side of the tread.

17. The method of claim 16, where the top outermost end has a width greater than or equal to 2 millimeters (mm).

18. The method of claim 16, where the top outermost end is in fluidless communication with an outer ground engaging side of the tread in an unworn state.

19. The method of claim 1, where portions of the submerged void above the opening extend in a direction of the submerged void length along a path different than the path of the opening where the path of the opening extends in a direction of the submerged void length along an alternating, non-linear path having an amplitude greater than the width of the submerged void.

\* \* \* \* \*